Oct. 3, 1961      N. GUEVARA      3,002,664
BAGGAGE RACK FOR AUTOMOBILES
Filed Oct. 30, 1959
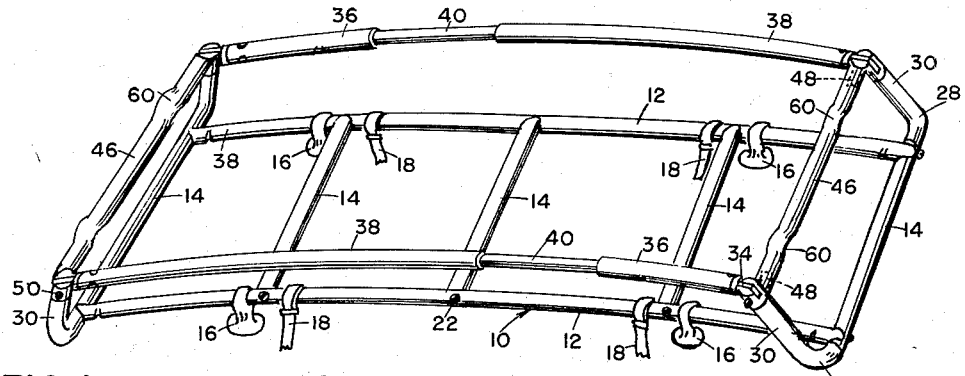
FIG.1
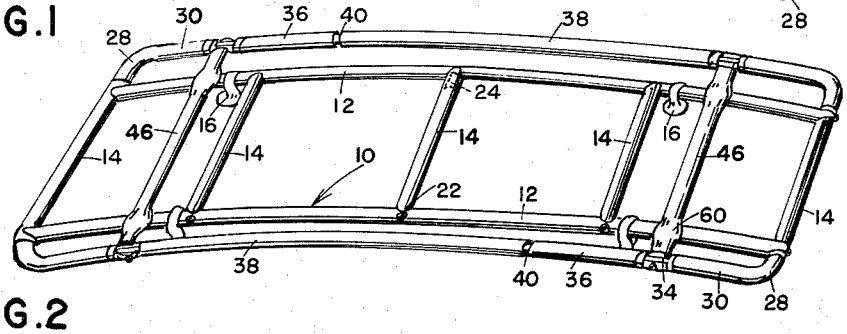
FIG.2
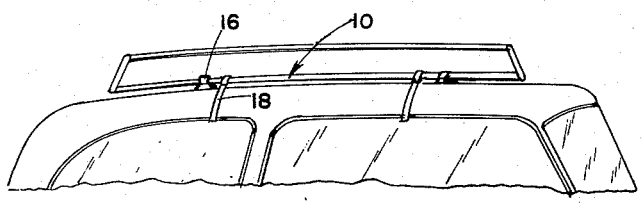
FIG.3
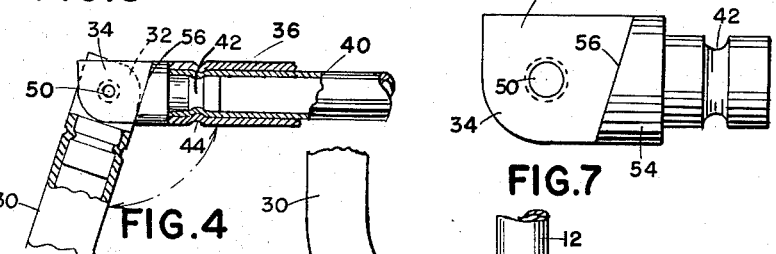
FIG.4     FIG.7
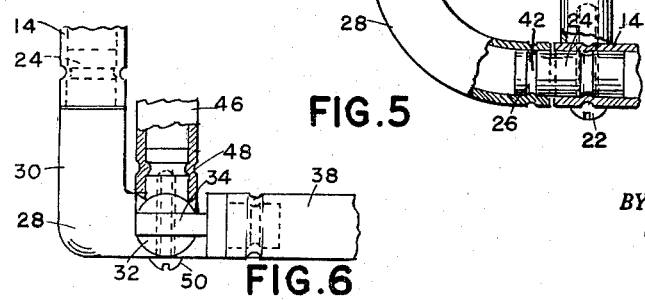
FIG.5
FIG.6
INVENTOR.
Nicholas Guevara.
BY *Moses, Nolte & Nolte.*
ATTORNEYS.

United States Patent Office 3,002,664
Patented Oct. 3, 1961

3,002,664
BAGGAGE RACK FOR AUTOMOBILES
Nicholas Guevara, 174 Center St., Brooklyn, N.Y.
Filed Oct. 30, 1959, Ser. No. 849,833
1 Claim. (Cl. 224—42.1)

This invention relates to a rack for attachment to an automobile top for holding baggage or other packages. The object of the invention is to provide a rack which is simple and rugged in construction, which when opened for the reception of baggage presents an attractive appearance and which may be folded down close to the automobile top when not in use.

In accordance with the invention a base frame is provided which may be secured to the automobile top in any suitable manner and which has end frames hinged to the base frame, the end frames being connected by telescopic side rails.

In the accompanying drawings which form a part of this application

FIGURE 1 is a perspective view of a construction embodying a preferred form of the invention in open position for the reception of baggage;

FIG. 2 is a similar view showing the rack folded when not in use;

FIG. 3 is a side elevation showing the rack applied to the top of an automobile;

FIG. 4 is a view partly in vertical section and partly in elevation of one of the hinge connections between the end frames and the side rails;

FIG. 5 is a view partly in section and partly in elevation of a connection between the end and base frames;

FIG. 6 is a plan view of the hinge connection shown in FIG. 4, partly broken away; and FIG. 7 is a detailed view of one of the hinge elements.

Referring to the drawings in detail, the rack comprises a base frame 10 which is shown as comprising longitudinal bars 12 and cross bars 14 secured together in any suitable manner and adapted to be attached to the automobile top in any convenient way. Preferably the base frame has rubber suction cups 16 attached thereto which rest on the automobile top, and the frame may be held down by means of straps 18 or metal clamps such as are frequently employed. The bars 12 and 14 are preferably metal tubes, the tubes 14 having plugs 24 secured in their ends by means of grooves and ribs, as indicated in FIGURE 5, for example, the longitudinal bars being attached to the plugs by screws 22. The end bars 14 have plugs 24 fitted in their ends to which the ends of the bars 12 are secured (FIG. 5), the ends of the plugs 24 projecting beyond the bars 12, as indicated at 26, and rotatively mounted on these portions 26 are the angularly disposed ends 28 of frame bars 30. Mounted in the tops of end frame bars 30 are hinge fittings 32 to which are pivoted hinge fittings 34. Mounted on the hinge fittings 34 are tubular side rail portions 36 and 38, one of which is preferably longer than the other, the positions of the long and short portions 36 and 38 being preferably reversed in the two side rails, as this gives a somewhat firmer construction to the rack. Mounted inside of the shorter side rail portions 36 are telescopic tubes 40 which have a sliding fit inside of the rail portions 38. The tubes 40 may conveniently be secured to the fittings to which the rail members 36 are secured by merely being carried through the members 36 which they fit closely, both members 36 and 40 being secured to the fitting at the same time. This may conveniently be done by providing the fitting with a groove 42, the tubes being then depressed or dented, as indicated at 44, so as to interlock with the groove 42. The tube members 36 and 40 may be simultaneously connected to the fitting by a single denting operation, and where there is only one thickness of tube, as at 38, this may be similarly secured to its fitting by a denting operation. The projecting arms of the angle members 30 are joined by end rail members 46 which carry plugs 48 and which are secured to the pintles 50 upon which the fitting members 32 and 34 pivot. The side rail members 36, 38 and 40 may be given a slight curvature depending upon the shape of the automobile top on which the rack is to be mounted, and such curvature will not interfere with the telescopic action which takes place when the rack is folded down, as shown in FIGURE 2. In fact, the curvature tends to produce a closer fit and prevent rattling. Fittings 32 and 34 are preferably formed as shown in FIGURES 4, 6 and 7, one of the fittings being bifurcated and receiving the tongue portion 52 of the other fitting between the bifurcations, the tongue portion 52 projecting from a flanged end 54 of the fitting, the flanged end being so shaped as indicated at 56, in FIGURES 4 and 7, as to form a stop limiting the angle of pivotal movement between the members 30 and the longitudinal rails. Preferably the angle between these members is limited to an obtuse angle of slightly more than 90 degrees so that when the rack is opened, as shown in FIGURES 1 and 3, the end frames of the rack will slope towards each other. This is a stronger construction and also presents an attractive appearance with cars of modern design with sloping windshield and rear window.

The cross bars 46 may be slightly flattened, as indicated at 60, so as to fit down over the bars 12 and permit full collapsing of the rack.

It will be seen that the construction described above is very simple and rugged, and can be made essentially rattle-proof. When not in use the rack can be folded close to the automobile top, as shown in FIGURE 2, and all that is necessary to prepare the rack for use is to pull up on the cross bars 46 so as to expand the rack to the position shown in FIGURES 1 and 3.

I claim:

A baggage rack comprising, in combination, a generally rectangular base frame composed of parallel longitudinal rods and front and rear transverse tubular members fixedly connected to the longitudinal rods, attaching members carried by the longitudinal members and extending downward from them for mounting the rack on a vehicle top, cylindrical plugs secured in opposite ends of the transverse tubular members and having protruding end portions, front and rear pairs of outboard, tubular elbow members having horizontal arms and angularly extending free end portions, said horizontal arms disposed to extend outward from opposite ends of the transverse tubular members in alignment with them, and secured upon the protruding plug ends with capacity for folding movement between a collapsed condition in which the free end portions extend along the outer sides of the longitudinal rods, and an erected condition, transverse front and rear baggage confining rails carried respectively by the free end portions of the front and rear pairs of elbow members, telescopic baggage confining side rails also carried by the free end portions of the elbow members at opposite sides of the rack, cooperative pairs of hinge fittings secured in the free ends of the elbow members and in the free ends of the telescopic side rails, the fittings of each pair having ears disposed in overlapped relation, pintles passed through the overlapped ears in alignment with the associated front and rear rails and secured in the adjacent ends of said rails, the hinge fittings of each cooperative pair including engageable stop surfaces constructed and arranged positively to limit erecting movement of the elbow members to definite positions.

References Cited in the file of this patent

UNITED STATES PATENTS

| | | |
|---|---|---|
| 501,918 | Caldwell | July 25, 1893 |
| 1,243,153 | Gabler | Oct. 16, 1917 |
| 2,663,472 | Belgau | Dec. 22, 1953 |
| 2,830,835 | Woodruff | Apr. 15, 1958 |

FOREIGN PATENTS

| | | |
|---|---|---|
| 471,194 | Italy | May 7, 1952 |
| 288,614 | Switzerland | May 15, 1953 |
| 1,092,494 | France | Apr. 25, 1955 |